F. M. FABER.
METHOD OF AND APPARATUS FOR MAKING MOTION PICTURE FILMS.
APPLICATION FILED SEPT. 15, 1913.
1,143,521.
Patented June 15, 1915.
3 SHEETS—SHEET 1.
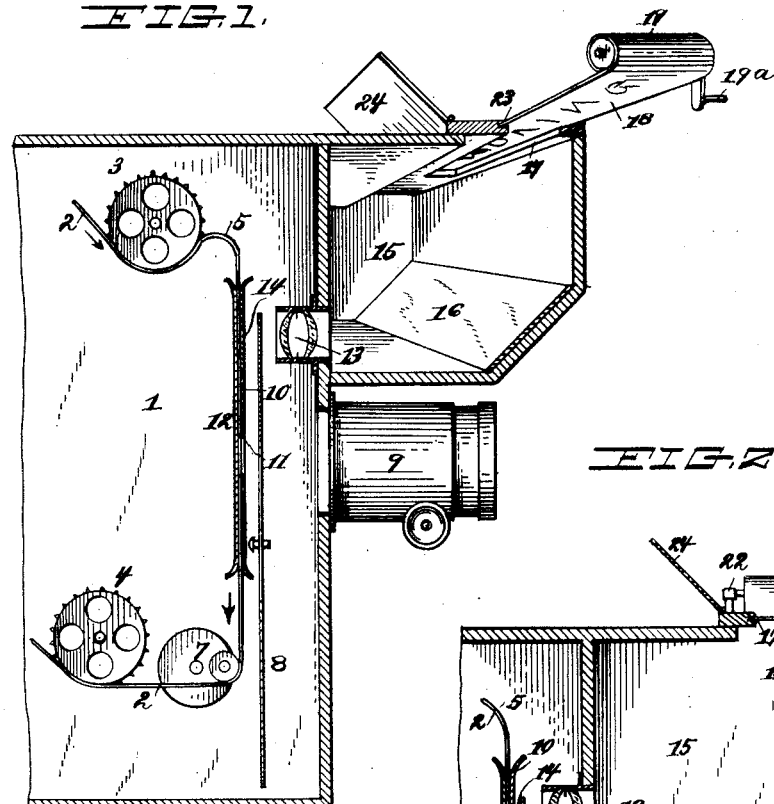
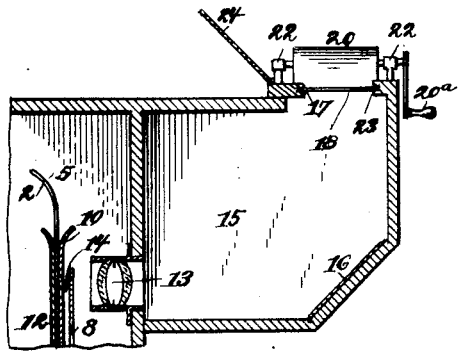
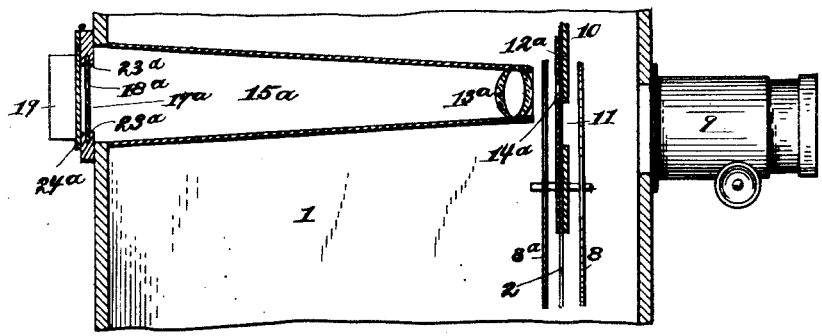
WITNESSES:
INVENTOR
Frank M. Faber.
BY
Harry Frease
ATTORNEY F. M. FABER.
METHOD OF AND APPARATUS FOR MAKING MOTION PICTURE FILMS.
APPLICATION FILED SEPT. 15, 1913.
1,143,521.
Patented June 15, 1915.
3 SHEETS—SHEET 2.
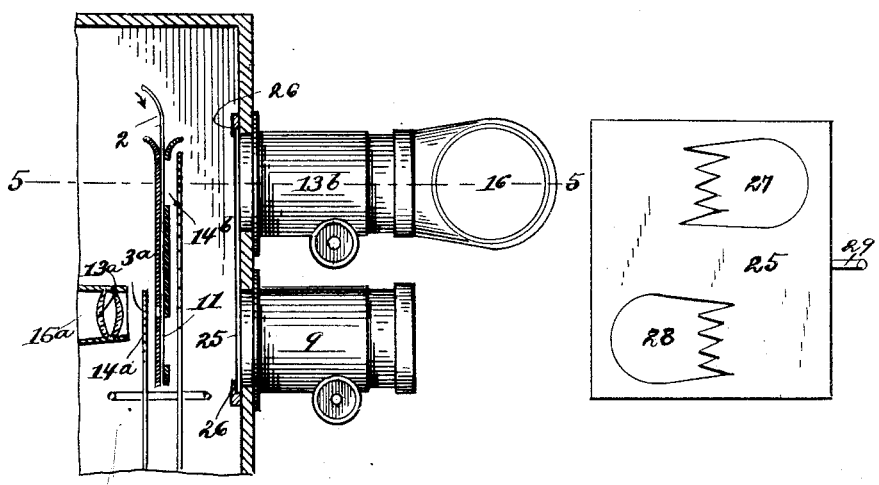
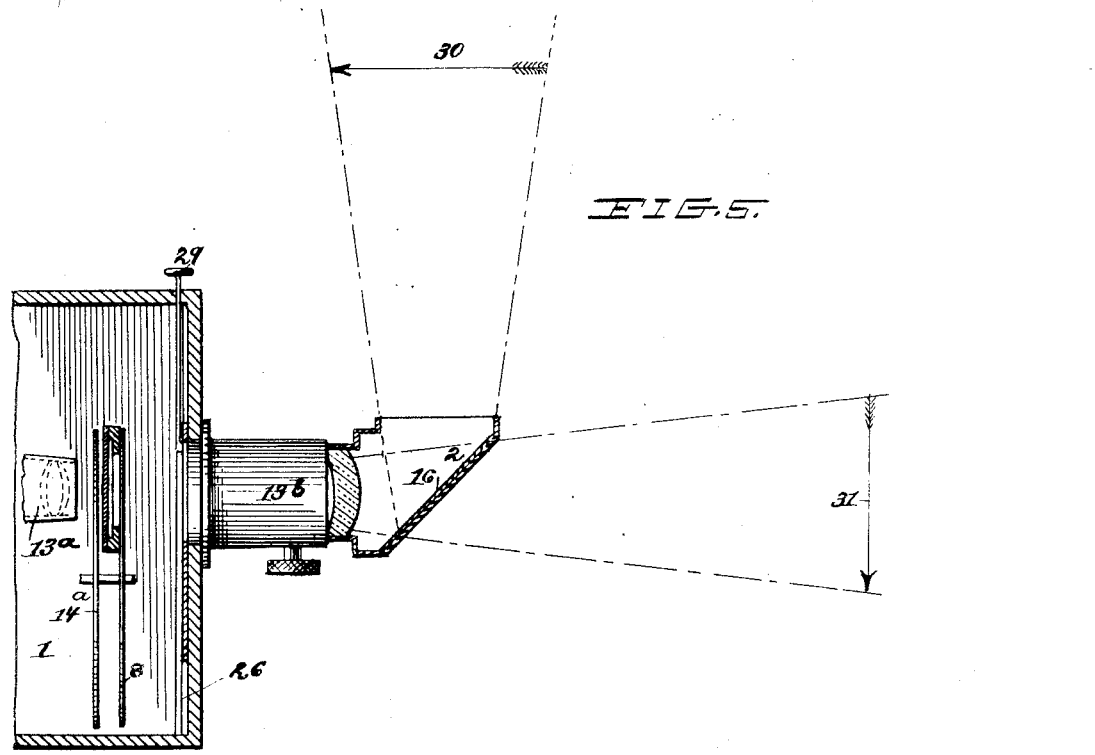
WITNESSES:
J. C. Turner
Louise Corby
INVENTOR
Frank M. Faber.
BY
Harry Frease
ATTORNEY F. M. FABER.
METHOD OF AND APPARATUS FOR MAKING MOTION PICTURE FILMS.
APPLICATION FILED SEPT. 15, 1913.
1,143,521.
Patented June 15, 1915.
3 SHEETS—SHEET 3.
FIG. 8.
FIG. 7.
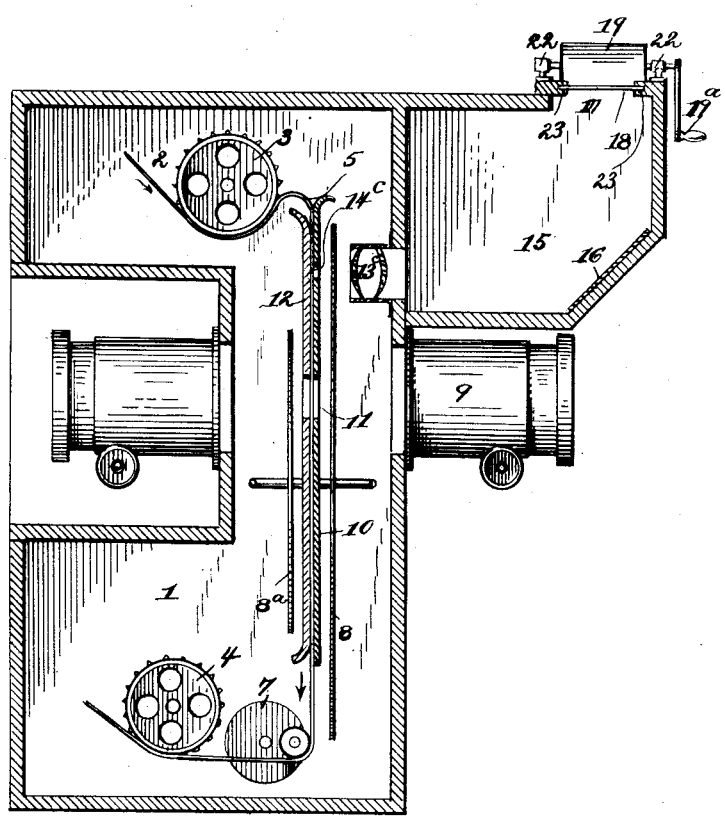
WITNESSES:
INVENTOR
Frank M. Faber.
BY
Harry Freose
ATTORNEY

UNITED STATES PATENT OFFICE.

FRANK M. FABER, OF CANTON, OHIO.

METHOD OF AND APPARATUS FOR MAKING MOTION-PICTURE FILMS.

1,143,521.  Specification of Letters Patent.  Patented June 15, 1915.

Application filed September 15, 1913. Serial No. 789,778. REISSUED

*To all whom it may concern:*

Be it known that I, FRANK M. FABER, a citizen of the United States, residing at Canton, in the county of Stark and State of Ohio, have invented a certain new and useful Method of and Apparatus for Making Motion-Picture Films, of which the following is a specification.

The invention relates to methods and apparatus for the making of a motion picture film, which after being exposed in the camera and developed in the usual manner, is known as the negative from which a positive is made for producing the appearance of objects in motion, when projected upon a screen by a properly designed stereopticon.

The object of my invention is to imprint on the margins of all or a part of the individual pictures of the film, a title or description of the scene or action portrayed, which title changes with the scene or action.

The invention may also be employed to advantage in the production of certain kinds of so called trick pictures, wherein effects are now produced by double exposure or double printing, as in the production of so called spirit pictures or ghosts; and also in the production of dissolving views.

Heretofore, the scenes or actions displayed at moving picture exhibitions, have been described or explained to the audience either by word of mouth, or by projecting upon the screen in advance of the projection of the picture, a title descriptive in more or less detail of the scenes or action to follow; it being understood that when the latter method has been employed, the title or descriptive matter has not been displayed contemporaneously with and in correspondence with the scene or action. The latter method, though almost universally employed, is unsatisfactory for the reason that the distinct events or objects of interest displayed are frequently so great in number and occur in such rapid succession, that it would overtax the capacity of the ordinary observer to carry in mind and properly apply the full description, given beforehand of so rapidly changing a succession of events.

By way of illustration, reference is made to the views taken from a rapidly moving railroad train, such as are frequently displayed, wherein points of interest succeed each other in rapid succession, and though a full description displayed before hand would be of small value to an audience for reasons stated above, it would not be practicable to break the scene and display, in the usual manner, the title description of each succeeding object of interest.

Again, in the so called moving picture plays, the actors are frequently seen to converse, while the audience is in ignorance of what they are saying. Finally the element of interest in many of the incidents of such plays is lost, since the story told in advance precludes the possibility of surprise. So that an important object of my invention is, in great measure if not entirely, to dispense with the present method of interrupting the scenes from time to time to interpolate titles descriptive of what is to follow; and to provide a film which will project simultaneously upon a screen a changing scene and a title descriptive thereof, said title changing in correspondence with the scene.

The improved film is preferably made by adding to the motion picture camera in common use, a supplementary lens or lenses, which supplementary lens is focused on a part of the film, either adjacent to, at a distance from, or coinciding with the part thereof upon which the principal lens is focused, with the object of imposing on the sensitized film a photographic imprint of separate scenes presented to the two lenses respectively, either by simultaneous action of both lenses on the same or different parts of the film, or of imposing a photographic imprint on the film of the scene presented to the supplementary lens on a part of the film adjacent to but not included in the part of the sensitized film affected by light passing through the principal lens.

Several forms of such an apparatus are illustrated in the accompanying drawings, forming part hereof, in which—

Figure 1 is a sectional view of a moving picture camera showing the supplemental features thereof partly in section and partly in perspective: Fig. 2, a vertical sectional view of the supplemental feature; Fig. 3, a modified form of the apparatus in sectional elevation; Fig. 4, a section of another modified form of the apparatus; Fig. 5, a plan section on line 5—5, Fig. 4; Fig. 6, a form of screen or shutter used in connection with the form of apparatus shown in Figs. 4 and 5; Fig. 7, another modified form of the apparatus; and Fig. 8, a fragmentary view of the finished film made by the improved method.

Similar numerals refer to similar parts throughout the drawings.

1 is the motion picture camera box having light tight walls; 2, the film which moves in the direction indicated by the arrow; 3 and 4, the feed rolls; 5, the loop formed in the film; 7, a beater mechanism for imparting the intermittent motion to the film; 8, the revolving shutter for screening the film when in motion and exposing it when stationary; 9, the principal lens; 10, the film gate; 11, the principal window therein for the principal lens; and 12, the tension plate for keeping the film flat and in alinement. These parts constitute the main elements of a type of moving picture camera in general use.

For the purpose of affixing titles to the individual pictures of the scenes or actions, as the same are being taken on the film by the principal lens, it is preferred to use the arrangement shown in Fig. 1, in which the supplementary lens 13 is focused on the film at a supplementary window 14 located in the gate to expose a part of the film which will advance to and coincide with or be adjacent to the part thereof which will be exposed to the principal lens.

The light-tight compartment or extension 15 is provided on the camera box in which is provided the inclined mirror 16 and the window 17. 18 is a strip of transparent or preferably translucent material on which is inscribed continuously and in proper sequence, descriptive matter of the scenes or actions to be photographed. 19 and 20 are reels onto and from which the strip 18 may be rolled by turning the cranks 19ᵃ and 20ᵃ. The reels are supported by suitable brackets 22 attached to the extension 15, and the strip 18 slidingly fits the grooves 23 in the sides of the window 17. 24 is a shutter with which the window 17 may be closed.

The arrangement illustrated in Fig. 1 provides means for photographing on all or a part of the margins of the pictures on successive sections of the film, successive titles or inscriptions descriptive of the changing scenes portrayed, so that such successive titles or inscriptions will be exhibited simultaneously and with the changing scenes which they respectively describe. For operating the camera, the descriptive matter of the scenes or actions to be photographed are inscribed upon the strip 18 in the order in which they will occur; the words being either clear on a dark background or dark on a clear background. Light passing through the strip 18 is reflected by the mirror 16 through the supplementary lens 13, the image of the strip 18 being focused on the part of the sensitized film at the window 14.

As the scene changes or the action progresses, the title bearing strip 18 is drawn past the window by turning one of the cranks, so as to suit the word to the action. The distance from the bottom of the window 14 to the top of the window 11, is equal to the distance, or a multiple of the distance, which the film advances in each successive movement; consequently, when the machine is in operation, the latent image impressed upon the sensitized film at the window 14 by the supplementary lens will, after having advanced the intervening intervals, occupy a position above and adjacent to the window 11, through which window the latent image of the scene being photographed is impressed by the principal lens 9; and the next successive movement of the film carries the part of the film impressed by the supplementary lens, beyond the window 11. Thus the image of the title or inscription on the strip 18 will, when the film is developed, appear on the margins of the pictures due to the principal lens 9, as shown in Fig. 8, wherein the relative change in the positions of the scenes and titles are greatly exaggerated.

The resulting picture will, when projected upon a screen in the usual manner, appear to the observer as having a descriptive title on the margin, and if the title bearing strip 18 be kept in motion while the views are being taken, the title as finally projected upon the screen, will appear to move from right to left along the margin of the picture. It is evident that the title may be made to appear either at the top, bottom or sides of a picture, or that by changing the position of the supplementary lens 13 and window 14, relatively to the lens 9, that is by lengthening or shortening the vertical distance between them when the scene is being photographed, the title may be made to appear superimposed upon the face of the picture.

The reading matter on the strip 18 may be a simple title, or a more or less lengthy description of the scene, or it may be the words spoken by the characters in the scene. It is evident that the window 17 and the strip 18 might be located immediately in front of the lens, and the mirror 16 dispensed with; but if so located, the extension 15 would more or less obstruct the view of the principal lens 9 and would moreover render the outfit less compact.

In the modified form of apparatus shown in Fig. 3, the light-tight compartment 15ᵃ, the supplementary lens 13ᵃ, the supplementary window 14ᵃ, formed in the tension plate 12ᵃ, and the strip 18ᵃ are on the opposite side of the film to the principal lens 9. For this arrangement I add a revolving shutter 8ᵃ which performs the same function as the shutter 8 and acts in unison therewith; and the light acting on the sensitized emulsion, passes through the film. It is evident that a mirror may be employed in this modification to reflect the light from a window equivalent to 17 located at the top, bottom or either side of the camera. It is also evident that the lengthy strip 18 or 18$^a$ may be moved intermittently as the scene or action may require, or may be replaced by a series of short strips similar to the so called lantern slides used in the stereopticon.

In the modified form of apparatus shown in Figs. 4, 5 and 6, the supplementary lens 13$^a$ and window 14$^a$ may be located as in Fig. 3; and a second supplementary lens 13$^b$ and a reflecting mirror 16$^a$ are provided, the lens 13$^b$ being preferably of the same size as the principal lens 9, and the distance between the axes of these lenses and the center of the corresponding windows 11 and 14$^b$ is equal to a multiple of the distance which the film advances in each successive movement. Consequently, when the machine is in operation, the latent image hereinafter referred to as the supplementary image, formed on the sensitized film by lens 13$^b$ focused on the scene 30, hereinafter referred to as the supplementary scene, is, after having moved a certain number of increments, advanced to the space directly behind and coinciding with the window 11, when the latent image, hereinafter referred to as the principal image, formed by lens 9 focused on the scene 31, hereinafter referred to as the principal scene, is superimposed thereon and blended therewith.

Between the lenses 9 and 13$^b$ and the film, may be extended the opaque screen 25 in the grooves 26 which screen is provided with the diagonally opposed openings 27 and 28. The inner edges of these openings are serrated as indicated, and the vertical distance between the openings is equal to the distance between the centers of the lenses 9 and 13$^b$. The rod 29 it attached to the screen 25, which rod projects through the side of the camera for the purpose of moving the screen back and forth past the lenses in grooves 26.

When the screen 25 is moved past the lenses, the light is gradually shut off from one lens while it is gradually admitted to the other, and as the image formed by the one lens will gradually fade into darkness, that formed by the other lens will gradually increase from darkness to full brilliancy. Since the views imposed on the films by the two lenses are superimposed, as has been described, the so called dissolving view effect will be obtained, when the picture is projected on a screen in the usual manner, and it is evident that the same effect may be attained without the use of a screen by gradually illuminating one of the scenes 30 or 31 upon which the lenses are focused, while the other is gradually and simultaneously darkened.

In producing ghost or spirit pictures, so called, with this modification of the device, where a ghost is made to appear and disappear, during a dramatic performance, the screen 25, is dispensed with, and one of the lenses say 13$^b$, is provided with a shutter, the actor personating the ghost is clad in light colored garments, and stationed say at 30, Fig. 5, and his image is focused on the film by the lens 13$^b$, the back ground, (not indicated in the drawing), being black so that the image of the ghost only will be imposed on the film. The theatrical performance, including scenery, etc., takes place at 31, Fig. 5, and its image is formed on the film by lens 9. With the camera thus arranged, the image of the ghost may be gradually or suddenly thrown upon and withdrawn from the film by gradually or suddenly opening the shutter of the lens 13$^b$. It is evident that the same effect can be obtained by illuminating or darkening the ghost.

In the modified form of apparatus shown in Fig. 7, the lens 9 and the second supplemental lens 13$^c$ and their corresponding windows 11 and 14$^c$ respectively are directly opposite each other and simultaneously focus on opposite sides of the same part of the sensitized film; and the supplemental lens 13 and its window 14 may be arranged as in Fig. 1, it being understood that a screen, not shown, of the general character shown in Fig. 6, may be employed for dissolving the views opposite lenses 9 and 13$^b$. With this modification we have the dissolving view effect with the title changing simultaneously, and in accordance therewith.

It is evident that when the supplemental lens 13, 13$^a$ or 13$^b$ is arranged as in Figs. 1, 4, 5 and 7, the interval of time between the exposure of the film through the lenses 13, 13$^a$ and 13$^b$ and the exposure of the same picture field of the film through the lens 9 is so slight, that the exposure is made with a negligible difference of time; and in all forms of the apparatus shown and described herein, the simultaneous exposure of the film through all of the several lenses to all of the several views, are either upon the same or adjacent parts of the film, and are included within that section of the film which is projected upon the screen at the same instant by a single lens, which section of the film is herein referred to as a picture field of the film.

In the arrangement shown in Fig. 1, the focal length of lens 13 is preferably shorter than that of lens 9 so that the title on strip 18, may for convenience, be printed on an ordinary typewriter and yet be so reduced in size on the film as to be of minimum height; and it is evident that when employing three or more lenses all may be of different focal lengths as circumstances may require.

The revolving shutter 8 and also its companion 8' may be of the usual broken disk type, and it will be understood that the wings of the disk or disks are so related as to expose the portion of the film at all of the windows 11, 14 and 14ª at and during the same short interval of time. It is also evident that though, in the arrangement shown in Fig. 1, the images of the title and the view which appear in juxtaposition on the negative are formed or exposed during the same interval of time, the title was formed, one or more intervals of exposure before its respective picture was formed.

In the foregoing, I have described the moving picture camera in which the film has an intermittent movement, but it is evident, to those skilled in the art, that my device may, with proper modifications, be embodied in cameras in which the movement of the film is continuous.

It will be understood that the distinctive feature of this invention, is the method of exposing the sensitized film of a picture camera, to a plurality or a multiplicity of scenes, each scene being focused on the film by a separate lens, and each scene being out of the field of view of all other lenses, excepting the one which focuses its image on the film.

It is evident that should the entire camera be moved while in process of taking pictures, as when being carried on a vehicle or moved upon its base to "panorama" a scene, such movement will not displace the image of the title on the film, since the title is attached to and carried with the camera by means of the brackets 22 and the grooves 23.

I claim:

1. The method of making motion picture films consisting in exposing successive picture fields thereof in rapid succession through a plurality of separate lenses acting on opposite sides of the film, to a plurality of separate changing scenes.

2. The method of making photographic films for the exhibition of objects in motion, consisting in passing a sensitized film across a principal lens at a high rate of speed and with an intermittent motion, and exposing successive picture fields of the film during periods of rest to a scene of action, and exposing the same picture fields to a moving title through a supplementary lens.

3. The method of making motion picture films consisting in imposing on the sensitized film by means of a principal lens, a series of principal images of a principal scene, and imposing on the films by means of a supplementary lens, a series of supplementary images of a separate scene, the supplementary images being superposed on the principal images and said separate scene being outside the field of view of the principal lens.

4. The method of making motion picture films consisting in simultaneously exposing the film through a lens to a scene of action, and through a supplementary lens to a moving title descriptive of the scene of action, said title changing simultaneously and in correspondence with the changes in the scene of action.

5. The method of making motion picture films consisting in imposing the image of a scene of action on the sensitized film by a lens, and simultaneously imposing the image of a moving title on the film by a supplementary lens, said title being descriptive of and changing simultaneously and in correspondence with the changes in the scene of action.

6. The method of making motion picture films consisting in imposing on a sensitized film, by means of a principal lens, successive images of a scene of action, and simultaneously imposing on the same film by means of a supplementary lens, successive images of a moving title descriptive of said scene of action, the title being outside of the field of view of the principal lens and changing simultaneously and in correspondence with changes in the scene of action.

7. In a photographic apparatus including a sensitized transparent film, a camera obscura focusing on one side of the film, and a supplementary camera obscura focusing on the other side of the same picture field of the film.

8. In a photographic apparatus including a sensitized transparent film, a principal camera obscura, and a supplementary camera obscura, the respective cameras focusing and superposing the images of different scenes on opposite sides of the emulsion on the film.

9. In a photographic apparatus including a sensitized transparent film, a principal camera obscura, a supplementary camera obscura external to the principal camera, both cameras focusing on the same picture field on opposite sides of the emulsion on the film.

10. In a photographic apparatus including a sensitized transparent film, a principal camera obscura focusing the image of a scene on one side of the film and a supplementary camera obscura focusing the image of a different scene on the other side of the film, the respective cameras superposing the images upon the film.

11. In a photographic apparatus including a sensitized transparent film, means for intermittently moving the film, a principal camera obscura, and a supplementary camera obscura, the respective cameras being adapted to focus and superpose the images of different scenes on the corresponding picture fields of the film, and means for gradually shutting off light from one camera while gradually admitting light to the other camera.

12. In a photographic apparatus, means for intermittently moving a sensitized transparent film, a principal camera obscura arranged to focus the image of a scene on successive picture fields of the film, and a supplementary camera obscura arranged to focus and superpose the image of a different scene upon the image of the scene focused by the principal camera obscura.

13. In a photographic apparatus, means for intermittently moving a sensitized transparent film, a principal camera obscura arranged to focus the image of a scene on successive picture fields of the film, a moving title bearing strip, and a supplementary camera obscura arranged to focus the image of the title on corresponding picture fields of the film.

14. In a photographic apparatus, means for intermittently moving a sensitized film, a principal camera obscura arranged to focus the image of a scene on successive picture fields of the film, a moving title bearing strip, a supplementary camera obscura arranged to focus the image of the title on corresponding picture fields of the film, and a shutter for simultaneously shielding the film, when in motion, from light entering both cameras, and when at rest exposing it thereto.

15. In a photographic apparatus, means for intermittently moving a sensitized film, a principal camera obscura arranged to focus the image of a scene on successive picture fields of the film, a moving title bearing strip, a supplementary camera obscura arranged to focus the image of the title on corresponding picture fields of the film, and means in one of the cameras for reflecting the light entering the same.

FRANK M. FABER.

Witnesses:
ELFRIEDE SCHMIDT,
LOUISE CORBY.